(12) United States Patent
Fletcher

(10) Patent No.: US 12,243,054 B2
(45) Date of Patent: Mar. 4, 2025

(54) SYSTEMS AND METHODS FOR ADDRESSING SECURITY-RELATED VULNERABILITIES ARISING IN RELATION TO OFF-BLOCKCHAIN CHANNELS IN THE EVENT OF FAILURES IN A NETWORK

(71) Applicant: nChain Licensing AG, Zug (CH)

(72) Inventor: John Fletcher, Cambridge (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 18/626,083

(22) Filed: Apr. 3, 2024

(65) Prior Publication Data

US 2024/0265384 A1  Aug. 8, 2024

Related U.S. Application Data

(60) Continuation of application No. 18/198,202, filed on May 16, 2023, now Pat. No. 11,983,709, which is a
(Continued)

(30) Foreign Application Priority Data

Jun. 14, 2017 (GB) ..................................... 1709431
Jun. 14, 2017 (GB) ..................................... 1709432

(51) Int. Cl.
*H04L 9/32* (2006.01)
*G06F 9/54* (2006.01)
(Continued)

(52) U.S. Cl.
CPC ......... *G06Q 20/3829* (2013.01); *G06F 9/542* (2013.01); *H04L 9/0637* (2013.01);
(Continued)

(58) Field of Classification Search
CPC ..... H04L 9/0637; H04L 9/0643; H04L 9/085; H04L 9/30; H04L 9/3239; H04L 9/3247;
(Continued)

(56) References Cited

U.S. PATENT DOCUMENTS 10,102,265 B1   10/2018   Madisetti et al.
10,410,212 B2   9/2019    Heyner
(Continued)

FOREIGN PATENT DOCUMENTS

CN   106850200 A   6/2017
EP   3264672 A1    1/2018
(Continued)

OTHER PUBLICATIONS

Anonymous, "Whitepaper—Resources—Cosmos Network", Jan. 1, 2017, URL:https://cosmos.network/resources/white paper, 30 pages.
(Continued)

*Primary Examiner* — Minh Dinh
(74) *Attorney, Agent, or Firm* — Tarolli, Sundheim, Covell & Tummino LLP

(57) ABSTRACT

A method in accordance with the invention includes: providing to a hub, from an enclave associated with a TEE at a node, an enclave public key; establishing a channel with the hub by broadcasting to a blockchain network a funding transaction which encumbers a digital asset with a first public key, a second public key and a third public key such that the encumbrance of the digital asset may be removed by: 1) both a first signature generated from a first private key corresponding to the first public key and a second signature generated from a second private key corresponding to the second public key; or 2) a third signature, valid for the third public key, the third public key associated with a group; receiving a commitment transaction encrypted with the
(Continued)

enclave public key; detecting a failure; issuing a failsafe activation request to the group using data from the enclave.

12 Claims, 8 Drawing Sheets

Related U.S. Application Data division of application No. 16/622,866, filed as application No. PCT/IB2018/054210 on Jun. 11, 2018, now Pat. No. 11,687,922.

(51) Int. Cl.
| | |
|---|---|
| *G06Q 20/38* | (2012.01) |
| *H04L 9/06* | (2006.01) |
| *H04L 9/30* | (2006.01) |
| *H04L 9/40* | (2022.01) |
| *G06F 21/57* | (2013.01) |
| *H04L 9/00* | (2022.01) |

(52) U.S. Cl.
CPC .............. *H04L 9/0643* (2013.01); *H04L 9/30* (2013.01); *H04L 9/3239* (2013.01); *H04L 9/3247* (2013.01); *H04L 9/3255* (2013.01); *H04L 63/1441* (2013.01); *G06F 21/57* (2013.01); *H04L 9/50* (2022.05); *H04L 63/0442* (2013.01); *H04L 2209/56* (2013.01)

(58) Field of Classification Search
CPC ..... H04L 9/3255; H04L 9/50; H04L 2209/56; H04L 63/1441; G06F 21/57; G06F 9/542; G06Q 20/3829
See application file for complete search history.

(56) References Cited

U.S. PATENT DOCUMENTS

| | | | |
|---|---|---|---|
| 11,223,609 B2 | 1/2022 | Altenhofen et al. | |
| 2010/0023803 A1 | 1/2010 | Lehr et al. | |
| 2010/0037055 A1* | 2/2010 | Fazio ................... | H04L 9/3255 713/171 |
| 2011/0033050 A1 | 2/2011 | Maller | |
| 2013/0226797 A1 | 8/2013 | Jiang et al. | |
| 2014/0258109 A1 | 9/2014 | Jiang et al. | |
| 2016/0350728 A1 | 12/2016 | Melika et al. | |
| 2017/0154331 A1 | 6/2017 | Voorhees | |
| 2017/0230189 A1 | 8/2017 | Toll et al. | |
| 2017/0236104 A1 | 8/2017 | Biton | |
| 2018/0109541 A1 | 4/2018 | Gleichauf | |
| 2018/0205555 A1 | 7/2018 | Watanabe et al. | |
| 2018/0212772 A1 | 7/2018 | Leavy et al. | |
| 2018/0268386 A1 | 9/2018 | Wack et al. | |
| 2019/0228413 A1 | 7/2019 | Naganuma et al. | |
| 2019/0394047 A1 | 12/2019 | Karame et al. | |

FOREIGN PATENT DOCUMENTS

| | | |
|---|---|---|
| EP | 3855677 A1 | 7/2021 |
| JP | 7072587 B2 | 5/2022 |
| WO | 2016161073 A1 | 10/2016 |

OTHER PUBLICATIONS

Antonopoulos, "Mastering Bitcoin—Unlocking Digital Cryptocurrencies," O'Reilly Media, Inc., Dec. 20, 2014, 282 pages.

Bentov et al., "Tesseract: Real-Time Cryptocurrency Exchange using Trusted Hardware," retrieved from https://pdfs.semanticscholar.org/f234/f428eb552b94435683e7e784e805c201d309.pdf, Nov. 28, 2017, 21 pages.
Bitcoinj, "Working With Micropayment Channels," bitcoinj, retrieved Sep. 26, 2017, https://web.archive.org/web/20170321012514/https://bitcoinj.github.io/working-withmicropayments, 8 pages.
Goldfeder et al., "Escrow Protocols for Cryptocurrencies: How to Buy Physical Goods Using Bitcoin," retrieved from http://stevengoldfeder.com/papers/escrow.pdf, Jul. 26, 2018, 27 pages.
Hearn, "Working with Micropayment Channels," retrieved from https://web.archive.org/web/20170321012514/https://bitcoinj.github.io/working-withmicropayments, Mar. 21, 2017, 8 pages.
International Search Report and Written Opinion mailed Aug. 17, 2018, Patent Application No. PCT/IB2018/054209, 12 pages.
International Search Report and Written Opinion mailed Aug. 20, 2018, Patent Application No. PCT/IB2018/054210, 13 pages.
Kent, "Security Requirements and Protocols for a Broadcast Scenario," IEEE Transactions on Communications, 29 (6): Jun. 1981, 9 pages.
Kremser, "[Lightning-dev] Proposal: Decentralized Service Provider," retrieved from https://lists.linuxfoundation.org/pipermail/lightning-dev/2016-March/000488.html, Mar. 11, 2016, 2 pages.
Lind et al., "Teechan: Payment Channels Using Trusted Execution Environments," retrieved from http://fc17.ifca.ai/bitcoin/papers/bitcoin17-final21.pdf, Mar. 7, 2017, 14 pages.
Lnquery, "IRC Logs for #lightning-dev | BotBot.me [o__o]," retrieved from https://botbot.me/freenode/lightning-dev/2016-10-01/?tz=Europe/London, Dec. 10, 2016, 13 pages.
Miller et al., "Sprites: Payment Networks that Go Faster than Lightning," Feb. 19, 2017, 24 pages.
Nakamoto, "Bitcoin: A Peer-to-Peer Electronic Cash System," Bitcoin, Oct. 31, 2008, https://bitcoin.org/bitcoin.pdf, 9 pages.
Poon et al., "The Bitcoin Lightning Network: Scalable Off-Chain Instant Payments," https://www.bitcoinlightning.com/wp-content/uploads/2018/03/lightning-network-paper.pdf, Jan. 14, 2016 [retrieved Dec. 10, 2018], 59 pages.
Poon, "[Lightning-dev] 2-of-3 Instant Escrow, or How to Do "2-of-3 Multisig Contract" Equivalent on Lightning," retrieved from https://lists.linuxfoundation.org/pipermail/lightning-dev/2016-January/000403.html, Jan. 17, 2016, 3 pages.
Satoshi et al., "Connection Limits," Bitcoin Forum, Aug. 9, 2010, https://bitcointalk.org/index.php?topic=741.0;prev_next=prev, 2 pages.
Stathakopoulou et al., "Threshold Signatures for Blockchain Systems," IBM Research, Apr. 2017, 42 pages.
Techmedia, "Teechan's Settlement Protocol," retrieved from http://techmediathink.hatenablog.com/entry/2016/12/24/152906, Dec. 24, 2022, 1 page.
Tschorsch et al., "Bitcoin and beyond: A technical survey on decentralized digital currencies," IEEE Communications Surveys and Tutorials 18(3):2084-123, Mar. 2, 2016.
UK Commercial Search Report mailed Sep. 29, 2017, Patent Application No. GB1709431.9, 7 pages.
UK Commercial Search Report mailed Sep. 29, 2017, Patent Application No. GB1709432.7, 7 pages.
UK IPO Search Report mailed Nov. 22, 2017, Patent Application No. GB1709432.7, 4 pages.
Shamir, "How to Share a Secret", Programming Techniques, 1979, 2 pages.
Poon, "The Bitcoin Lightning Network", Draft Version 0.5, 2015, 23 pages.
Nikkei Business Publications, Inc., "Micropayment Channel", 2016, 6 pages.
UK IPO Search Report mailed Nov. 22, 2017, Patent Application No. GB1709431.9, 4 pages.

* cited by examiner

SYSTEMS AND METHODS FOR ADDRESSING SECURITY-RELATED VULNERABILITIES ARISING IN RELATION TO OFF-BLOCKCHAIN CHANNELS IN THE EVENT OF FAILURES IN A NETWORK

CROSS-REFERENCE TO RELATED APPLICATIONS

The present application is a continuation of U.S. patent application Ser. No. 18/198,202, filed May 16, 2023, entitled "SYSTEMS AND METHODS FOR ADDRESSING SECURITY-RELATED VULNERABILITIES ARISING IN RELATION TO OFF-BLOCKCHAIN CHANNELS IN THE EVENT OF FAILURES IN A NETWORK," which is a division of U.S. patent application Ser. No. 16/622,866, filed Dec. 13, 2019, now U.S. Pat. No. 11,687,922, entitled "SYSTEMS AND METHODS FOR ADDRESSING SECURITY-RELATED VULNERABILITIES ARISING IN RELATION TO OFF-BLOCKCHAIN CHANNELS IN THE EVENT OF FAILURES IN A NETWORK," which is a 371 National Stage of International Patent Application No. PCT/IB2018/054210, filed Jun. 11, 2018, which claims priority to United Kingdom Patent Application No. 1709431.9, filed Jun. 14, 2017, and to United Kingdom Patent Application No. 1709432.7, filed Jun. 14, 2017, the disclosures of which are incorporated herein by reference in their entirety.

TECHNICAL FIELD

This invention relates generally to distributed ledgers, and more particularly to off-blockchain channels. The invention is particularly suited, but not limited to, providing a failsafe mode in the event of failure of off-chain channels which have been set up between participants for the purpose of electronic communication and exchange. Such channels, and the communications/transfers conducted over them, can be vulnerable to attack and exploitation in the event of a failure on the network.

BACKGROUND

In this document we use the term 'blockchain' to include all forms of electronic, computer-based, distributed ledgers. These include, but are not limited to blockchain and trans-action-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with a variant of the Bitcoin protocol and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, in the case of Bitcoin, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction—if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Scalability within blockchain protocols, including Bitcoin, is a topic of much debate within the cryptocurrency community. The issue of how to enable scaling raises various technical challenges. For example, since blockchain networks operate through a "gossip protocol" in which all state modifications to the ledger are broadcast to all participants and consensus of the state is agreed upon based on a gossip protocol, every node in the blockchain network must know about every transaction that occurs globally. This global tracking of transactions can limit the volume or frequency of transactions on at least some blockchain networks. For example, as implemented at the time of writing, Bitcoin would likely not be able to directly replace high-volume existing electronic payment systems, such as Visa™. Indeed, it has been estimated that implementing Visa™ transactions on Bitcoin would consume 400 terabytes of data per year. The many nodes of existing blockchain networks could not handle this amount of bandwidth and storage.

To accommodate higher transaction volumes, off-chain (i.e., off-blockchain) a technique known as "payment channels" has been proposed. For example, an off-chain payment channel called the "Lightning Network" is described by Poon and Dryja in "The Bitcoin Lightning Network: Scalable Off-Chain Instant Payments", Jan. 14, 2016. In accordance with the Lightning Network, transactions of value to occur off-blockchain. The Lightning Network describes a technique in which, in the event of certain uncooperative or hostile behaviour after a payment channel has been opened, commitment transactions previously exchanged off-chain can be broadcast to the blockchain network. The Lightning Network includes safeguards to remove the incentive for participants to broadcast outdated commitment transactions which do not reflect a current state of a payment channel. For example, as new commitment transactions are exchanged to update a state of a payment channel (e.g. to transfer value from one participant to another), a secret value that is associated with a previous commitment transaction is shared from one party to another. This value may be used in a breach remedy transaction (BRT). More particularly, if a participant node detects that another node has broadcast an outdated commitment transaction to attempt to commit the balance reflected by that outdated commitment transaction to the blockchain, the participant node may use the value to, instead, claim all digital assets in the payment channel. Under this breach remedy scheme, the commitment transactions are locked so that a party that generated a signature for the commitment transaction (who is typically the party that would broadcast the commitment transaction to the blockchain network) is required to wait before the digital assets associated with the commitment transaction can be spent. For example, the party may be required to wait 1000 blocks after broadcasting the commitment transaction before their transaction attempting to spend the digital assets will be added onto the blockchain. This waiting period allows a counter party time to issue a breach remedy transaction if the commitment transaction does not reflect the current state of the payment channel.

Payment channels are typically configured such that participants in the payment channel can transfer value off-chain but can move such transfers to the blockchain network when they wish to leave the payment channel. This may occur, for example, when a hub with which they have a payment channel becomes unresponsive. If, however, a large number of payment channels were to fail, the blockchain network may not have the capacity to handle the numerous transactions that are suddenly requested to be written to the blockchain. By way of example, if a hub that is a comparable size to the Visa™ network were to fail, the blockchain network may not be able to effectively handle all of the transactions that are suddenly broadcast to the blockchain network. Thus, a significant technical problem exists relating to network resilience and ability to handle exchanges in the event of a failure on the network.

If, for example, a node broadcast an outdated commitment transaction (i.e., a commitment transaction not reflecting the current state of the payment channel) to the blockchain network during such a failure, due to the bottleneck in transactions resulting from the failure, a breach remedy transaction may not be added to the blockchain rapidly enough to prevent the outdated commitment transaction from being subjected to the breach remedy transaction. Thus, payment channels may be vulnerable to attack during widespread failure.

Thus, there is a need for improved security techniques for configuring links or channels which have been established between parties for electronic exchange.

SUMMARY

Thus, in accordance with the present invention there is provided a method as defined in the appended claims. The invention may be referred to as a security method/system. It may be referred to as a cryptographically enforced security method. It may provide resilience on a blockchain network in the event of node failure. It may prevent or at least reduce the likelihood of exploitation in such circumstances.

As will be described in greater detail below, techniques for setting up a channel for off-chain transfers are described. More particularly, a congress is used during the setup of a channel. A congress is a group of nodes which may be joined by any node in the block chain network upon submission of sufficient stake (a "member deposit") to a pool of digital assets associated with the congress (a "congress pool"). For example, a node may join a congress through transfer of a digital asset, such as digital currency (such as bitcoin), tokens or other stake or value, to an account associated with the congress. The congress may be secured, in part, through distributed generation of private key shares. Each private key share may be used by its holder to generate a partial signature for a transaction. A threshold signature scheme may be used to generate a valid signature for such a transaction using at least a threshold of partial signatures. The member deposit is subject to confiscation for malicious behaviour.

Advantageously, nodes of the congress may be configured to implement a failsafe mode in which such nodes may close out (payment) channels when a hub ceases to operate in accordance with a predefined protocol. For example, if the hub becomes unresponsive, nodes of the congress may implement a failsafe protocol which closes payment channels in a manner that reduces the risk of the blockchain network becoming overwhelmed with transactions attempting to close channels. For example, the congress may perform a batch closing in which payment channels of a plurality of payment channels are closed in a single transaction. Further, the congress may stagger closings so that at least some channel closings are delayed.

Therefore, in accordance with the invention there may be provided a computer-implemented method. The computer-implemented method may include: providing to a hub, from an enclave associated with a trusted execution environment at a node, an enclave public key; establishing a channel with the hub by broadcasting to a blockchain network a funding transaction which encumbers a digital asset with a first public key, a second public key and a third public key such that the encumbrance of the digital asset may be removed by: 1) both a first signature generated from a first private key corresponding to the first public key and a second signature generated from a second private key corresponding to the second public key; or 2) a third signature, valid for the third public key, wherein the third public key is associated with a group; receiving, at the enclave, a commitment transaction from the hub, the commitment transaction encrypted with the enclave public key; detecting a failure of the hub; and issuing a failsafe activation request to the group using data from the enclave, the data based on the commitment transaction.

The channel may be referred to as an "exchange channel," "communication channel," or a "payment channel." Herein, we may use the term "payment channel" for ease of reference.

In some implementations, the failsafe activation request specifies a block number of a most recent block added to a blockchain of the blockchain network and the group is configured to disregard a failsafe activation request that is determined to be expired based on the block number specified in the failsafe activation request and based on a current block number of the most recent block added to the blockchain.

In some implementations, the method further includes: determining a failsafe mode has not been implemented and that the failsafe activation request has become expired; and issuing a further failsafe activation request to the group, wherein the further failsafe activation request includes a new block number for a new most recent block added to the blockchain.

In some implementations, issuing the failsafe activation request comprises automatically posting the failsafe activation request online in response to detecting the failure of the hub.

In some implementations, the failsafe activation request specifies a fee offered by the node for closing the channel.

In some implementations, the method includes, after the group has deployed a sidechain in response to the failsafe activation request, exchanging value with another node through the sidechain.

In some implementations, the failsafe activation request is generated within the enclave and signed using an enclave private key associated with the enclave public key.

In some implementations, the method further includes decrypting the commitment transaction to determine a balance associated with the channel and to determine a value associated with a breach remedy transaction. The value is a previously secret value associated with a previous commitment transaction.

In some implementations, the method further includes broadcasting a sidechain transaction to miners of a sidechain deployed in response to the failsafe activation request, the sidechain transaction transferring value.

In accordance with the invention there may be provided a computer-implemented method. The computer-implemented method may include: detecting one or more failsafe activation requests issued by one or more nodes participating in one or more channels with a hub, the channels allowing for commitments for an exchange of value associated with a blockchain network to be exchanged external to the blockchain network, the failsafe activation requests issued by nodes that previously opened channels by broadcasting a funding transaction which encumbers a digital asset with a public key associated with a group; determining that the one or more failsafe activation requests satisfy predetermined criteria; and cooperatively generating, with other nodes of the group, a valid signature for a transaction that closes one or more of the channels.

As above, the channel(s) may be referred to as Payment Channel(s), exchange channel(s) or communication channel(s). We may use the term "payment channel" hereafter for ease of reference.

In some implementations, determining that the failsafe activation requests satisfy predetermined criteria comprises determining that a number of failsafe activation requests, weighted by balances of respective nodes issuing such requests, exceeds a threshold.

In some implementations, the failsafe activation requests specify respective block numbers of most recent blocks added to the blockchain of the blockchain network when each failsafe activation request was generated and the group is configured to disregard a failsafe activation request that is determined to be expired based on the block number specified in the failsafe activation request and based on a current block number of the most recent block added to the blockchain.

In some implementations, the method further includes, after determining that the one or more failsafe activation requests satisfy predetermined criteria and before cooperatively generating the valid signature, deploying a temporary sidechain. The temporary sidechain allows value to be further transferred. The transaction that closes one or more of the channels may also be based on the value transferred on the sidechain.

In accordance with the invention, there may be provided an electronic device. The electronic device includes an interface device, a processor coupled to the interface device and a memory coupled to the processor. The memory has stored thereon computer executable instructions which, when executed, configure the processor to perform a method described herein.

In some implementations, the processor includes a trusted execution environment, and the computer executable instructions are executed within the trusted execution environment.

In accordance with the invention, there may be provided a computer readable storage medium. The computer readable storage medium includes computer-executable instructions which, when executed, configure a processor to perform a method described herein.

BRIEF DESCRIPTION OF THE DRAWINGS

These and other aspects of the present invention will be apparent from and elucidated with reference to, the embodiment described herein. An embodiment of the present invention will now be described, by way of example only, and with reference to the accompany drawings, in which.

DETAILED DESCRIPTION

Blockchain Network

Figure 1:
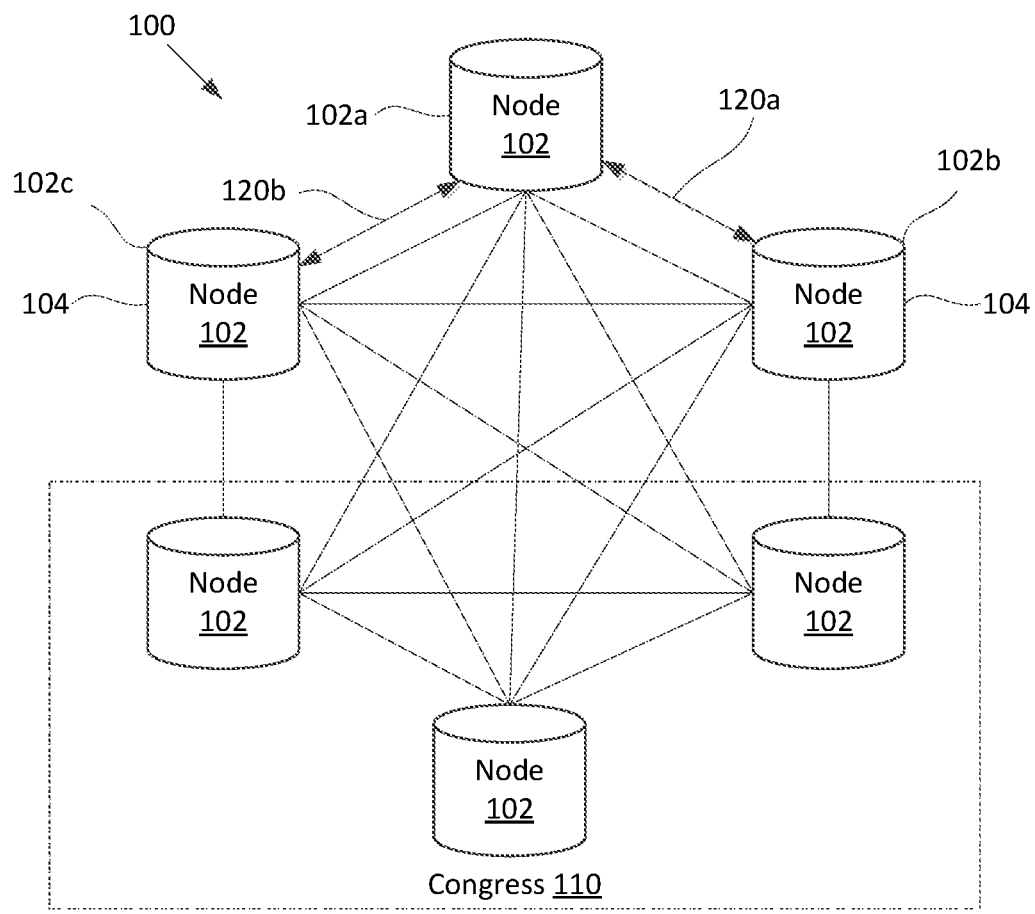
FIG. 1 illustrates a block diagram of an example blockchain network.

Reference will first be made to FIG. 1 which illustrates, in block diagram form, an example blockchain network 100 associated with a blockchain. The blockchain network may be a public blockchain network, which is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, for example.

The electronic devices that run the blockchain protocol and that form the nodes 102 of the blockchain network 100 may be of various types including, for example, computers such as desktop computers, laptop computers, tablet computers, servers, mobile devices such as smartphones, wearable computers such as smart watches or other electronic devices.

Nodes 102 of the blockchain network 100 are coupled to one another using suitable communication technologies which may include wired and wireless communication technologies. Such communication adheres to the protocol associated with the blockchain network. For example, where the blockchain is a bitcoin blockchain, the bitcoin protocol may be used.

Nodes 102 maintain a global ledger of all transactions on the blockchain. Thus, the global ledger is a distributed ledger. Each node 102 may store a complete copy or a partial copy of the global ledger. In the case of a blockchain secured by proof-of-work, transactions by a node 102 affecting the global ledger are verified by other nodes 102 so that the validity of the global ledger is maintained. When the blockchain is a proof-of-work based blockchain, blocks are also verified by checking the proof-of-work submitted with the block.

At least some of the nodes 102 operate as miners 104 of the blockchain network 100. The blockchain network 100 of FIG. 1 may be a proof-of-work blockchain in which miners 104 perform expensive computations in order to facilitate transactions on the blockchain. For example, the proof-of-work blockchain may require miners to solve a cryptographic problem. In Bitcoin, the miners 104 find a nonce such that a block header hashes, with SHA-256, to a number that is less than a value defined by the current difficultly. The hashing power required for the proof-of-work algorithm means that a transaction is considered practically irreversible after a certain number of blocks have been mined on top of it. A miner 104 who solves the cryptographic problem creates a new block for the blockchain and broadcasts the new block to other nodes 102. The other nodes 102 verify that the miner 104 has, in fact, solved the cryptographic problem and has, therefore, demonstrated sufficient proof-of-work before accepting that the block should be added to the blockchain. The block is added to the blockchain (i.e., to the distributed global ledger) by consensus of the nodes 102.

As an alternative to proof-of-work, the blockchain network 100 may, instead, be a proof-of-stake blockchain network. A proof-of-stake blockchain network provides an alternative mechanism for achieving consensus. In the proof-of-stake blockchain network, the blockchain is secured by proof-of-stake rather than proof-of-work. Under proof-of-stake, the miners deposit a security deposit of digital assets and, the probability of being selected as the node to mine a block is proportional to the quantity of the digital assets provided as a security deposit. Proof-of-stake blockchain systems can be used to avoid the computational expense and energy required to mine on proof-of-work blockchains. Further, proof-of-stake blockchains can allow for higher frequency and more regular block creation than proof-of-work blockchains.

The block created by the miner 104 includes transactions which had been broadcast to the block chain by nodes 102. For example, the block may include transactions from an address associated with one of the nodes 102 to an address associated with another of the nodes 102. In this way, the block serves as a record of a transaction from one address to another. The party which requested that the transaction be included in the block proves that they are authorized to initiate the transfer (e.g., in the case of Bitcoin, to spend the Bitcoin) by signing the request using a private key corresponding to their public key. The transfer may only be added to the block if the request is validly signed.

In the case of Bitcoin, there is a one-to-one correspondence between public keys and addresses. That is, each public key is associated with a single address. Thus, any reference herein to transferring digital assets to or from a public key (e.g., paying into the public key) and transferring digital assets to or from the address associated with that public key refer to a common operation.

Some of the nodes 102 in the blockchain network may not operate as miners and may, instead, participate as validating nodes. Validation of transactions may involve checking signature(s), confirming reference to valid UTXO, etc.

The example of FIG. 1 includes five nodes 102, two of which are participating as miners 104. In practice, the number of nodes 102 or miners 104 may be different. In many blockchain networks, the number of nodes 102 and miners 104 may be much greater than the number illustrated in FIG. 1.

As will be explained below, various nodes 102 may cooperate to form a group which will be referred to herein as a congress 110. In the example illustrated, three nodes 102 are shown as taking part in the congress 110. However, the actual number of congress 110 members may be much larger.

The congress 110 may be an open-membership group which may be joined by any nodes 102 upon submission of sufficient stake to a pool associated with the congress 110. For example, a node may join a congress through transfer of a digital asset, such as digital currency (such as bitcoin), tokens or other stake or value, to an account (e.g., to a group public address or group public key) associated with the congress 110. A node 102 joining a congress may be any node in the blockchain network including both mining and non-mining nodes.

The congress 110 may be used to facilitate setup of an off-blockchain payment channel 120a, 120b between nodes. This off-blockchain payment channel may be referred to herein as an off-chain payment channel, an off-chain channel, or a payment channel. The payment channel allows for the exchange of value off of the blockchain. The payment channel allows the channel state of the payment channel (i.e., the respective balances of the nodes involved in the payment channel) to be committed to the blockchain at any time. That is, the parties may transfer value in multiple off-blockchain transactions and may, at some point, update the blockchain to reflect the current channel state of the payment channel.

In the example embodiment, a first payment channel 120a is set up between two nodes—a first node 102a and a second node 102b, and a second payment channel 120b is set up between two nodes—a first node 102a and a third node 102c. However, in practice the payment channels may be set up between greater numbers of nodes or a different number of payment channels may be set up. The payment channels 120a, 120b may set up in a hub and spoke (HAS) arrangement in which a central hub (which, in the example, is the first node 102a) establishes payment channels with both a second node 102b and a third node 102c. This HAS arrangement allows any node connected to the hub to transfer value off-chain to any other nodes connected to that hub or to receive value off-chain from any other nodes connected to the hub. For example, the second node 102b may transfer value to or receive value from the third node 102c off-chain. The hub may be connected to a greater number of nodes than illustrated in FIG. 1. Further, hubs or non-hub nodes that are associated with one of the payment channels may establish other payment channels with other hubs or non-hub nodes.

During setup of a payment channel, the nodes associated with the payment channel (e.g., in the example illustrated, in the case of the first payment channel 120a, the first node 102a and the second node 102b and, in the case of the second payment channel 120b, the first node 102a and the third node 102c) each lock digital assets in a special way so as to fund the payment channel. After setup is complete, these digital assets may be allocated using commitment transactions and exchange of "values", which effectively invalidate the previous commitment transaction. More particularly, the payment channel allows the nodes associated with the payment channel to exchange commitment transactions. Commitment transactions are transactions that are exchanged by the nodes without (initial) broadcast to the blockchain network. The commitment transactions provide a ledger which defines the allocation of the digital assets associated with the payment channel. This allocation may be referred to as the channel state. The commitment transactions may be broadcast at any time by one of the nodes associated with the payment channel. The commitment transactions may generally operate as described by Poon and Dryja in "The Bitcoin Lightning Network: Scalable Off-Chain Instant Payments", Jan. 14, 2016 (hereinafter "the Lightning Network"). However, the payment channel may be set up in a manner that differs from that described in the Lightning Network. More particularly, a group of nodes referred to herein as a congress may be involved in the setup protocol to allow the group of nodes to assist if a payment channel fails. Such failure may, for example, occur due to failure of a hub. Protocols for setting up a payment channel that includes a failsafe mode provided by a congress and protocols for implementing the failsafe mode will be described in greater detail below.

Electronic Device Operating as a Node

Figure 2:
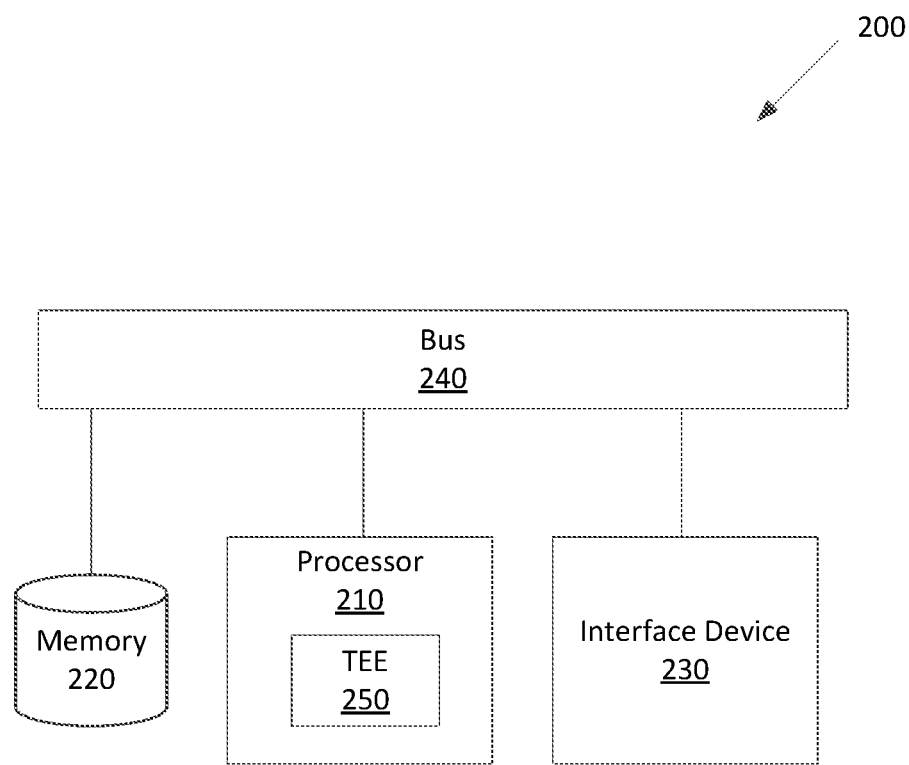
FIG. 2 illustrates a block diagram of an example electronic device which may function as a node in a blockchain network.

FIG. 2 is a block diagram illustrating components of an example electronic device 200 which may serve as a node 102 (FIG. 1) in a peer-to-peer blockchain network 100 (FIG. 1). The example electronic device 200 may also be referred to as a processing device. The electronic device may take various forms including, for example, a desktop computer, laptop computer, tablet computer, server, mobile device such a smartphone, wearable computer such as a smart watch, or a form of another type.

The electronic device 200 includes a processor 210, a memory 220 and an interface device 230. These components may be coupled directly or indirectly to one another and may communicate with one another. For example, the processor 210, memory 220, and interface device 230 may communicate with each other via a bus 240. The memory 220 stores a computer software program comprising machine-readable instructions and data for performing functions described herein. For example, the memory may include processor-executable instructions which, when executed by the processor 210, cause the electronic device to perform a method described herein. The processor-executable instructions may include instructions which, when executed by the processor 210, cause the electronic device to implement a protocol associated with the blockchain network 100 (FIG. 1). For example, the instructions may include instructions for implementing the Bitcoin protocol.

The memory 220 may store the global ledger of the blockchain network 100 (FIG. 1) or a portion thereof. That is, the memory 220 may store all blocks of the blockchain or a portion of the blocks, such as the most recent blocks, or a portion of the information in some blocks.

While the memory 220 is illustrated with a single block in FIG. 2, in practice the electronic device 200 may include multiple memory components. The memory components may be of various types including, for example, RAM, HDD, SSD, flash drives, etc. Different types of memory may be suited to different purposes. Further, while the memory 220 is illustrated separately from the processor 210, the processor 210 may include embedded memory.

As illustrated in FIG. 2, the processor 210 of some nodes 102 (such as nodes that form the congress 110 and/or nodes that participate in payment channels that provide for a failsafe mode as described herein) may include a secure area such as a Trusted Execution Environment (TEE) 250. The TEE 250 is an isolated execution environment which provides additional security to the electronic device 200 such as isolated execution, integrity of Trusted Applications and asset confidentiality. The TEE 250 provides execution space which guarantees that the computer instructions and data loaded inside the TEE 250 are protected in terms of confidentiality and integrity. The TEE 250 may be used to protect the integrity and confidentiality of important resources, such as keys. The TEE 250 is implemented, at least in part, at a hardware level so that instructions and data executed within the TEE 250 are protected against access and manipulation from the rest of the electronic device 200 and from external parties such as the owner of the electronic device. The data and computations within the TEE 250 are secured from the party operating the node 102 that includes the TEE 250.

The TEE 250 may operate to instantiate an enclave and then add pages of memory one at a time, while cumulatively hashing. A similar operation may also be performed on a remote machine (which may be a developer machine or another machine) so that the remote machine determines and stores the hash that is expected. The contents of an enclave can, therefore, be verified by any remote machine to ensure that the enclave is running an approved algorithm. This verification may be performed by comparing hashes. When an enclave is fully built, it is locked down. It is possible to run the code in the TEE 250 and to send secrets to the code, but the code cannot be changed. A final hash may be signed by an attestation key and may be made available to a data owner to verify it before the data owner sends any secrets to the enclave.

A TEE 250 that is used by a node which acts as a congress member may be used to protect the confidentiality and integrity of a private key share associated with a congress public key used by the congress 110 (FIG. 1). For example, the TEE 250 may be used for the generation and storage of private key shares. The TEE 250 is intended to ensure that no member is able to directly obtain the private key share held within the TEE 250 enclave, or information about other private key shares from inter-member communication or inter-enclave communication. The congresses protocol is also robust against compromise of a threshold of TEEs. Further, the TEE 250 may enable remote attestation which may be used by a node 102 (FIG. 1) to prove to other nodes 102 that a TEE 250 is authentic and is running approved computer executable instructions for a protocol that is implemented by a congress 110 or a payment channel. Remote attestation may be provided by the TEE 250 by running a particular piece of code and sending a hash of the code, internal to the enclave, signed by an internal attestation key for the enclave, which may also be referred to herein as an enclave private key.

The TEE 250 that is provided on a node which acts as a congress member may be used to attest to secure deletion of a private key share when a member of a congress 110 who has previously used the private key share on the electronic device 200 has chosen to leave the congress. The electronic device 200 may provide attestation of deletion to other congress members through a remote attestation protocol provided in the TEE 250. Attestation of deletion may be required before a member is permitted to withdraw their member deposit. That is, return of the deposit may be conditional on attestation to deletion of the private key share held within the member's enclave.

A TEE 250 that is provided on a node participating in a payment channel 120a, 120b (FIG. 1) with a hub may be used to allow the hub to verify that the node is executing approved code (e.g., through remote attestation). Further, an enclave of the TEE 250 stores an enclave private key which is associated with an enclave public key that may be provided to the hub. The hub may use the enclave public key to send encrypted messages to the enclave. These encrypted messages may include one or more commitment transactions, one or more values which may be used in a breach remedy transaction (BRT). That is, the values effectively invalidate outdated channel states. The commitment transactions and values may be decrypted by the enclave and provided to other components, systems, or subsystems of the node, such as a main processor of the node. The TEE and, more particularly, the enclave of the TEE 250 may also be used to generate a failsafe activation request should a payment channel hub become unresponsive. As will be described in greater detail below, the failsafe activation request may be generated, at least in part, based on data stored in the enclave. For example, the failsafe activation request may be generated based on the latest channel state (which reflects a current balance of digital assets in the payment channel). The failsafe activation request may also include other information, such as the most recent block added to the blockchain of the blockchain network and a statement of a fee offered to a congress in return for closing a channel. The failsafe activation request is signed by the enclave using the enclave private key so that it can be verified as having been provided by the enclave.

The TEE 250 may be equipped with a secure random number generator, which is internal to an enclave of the TEE, which can be used to generate private keys, random challenges, or other random data. The TEE 250 may also be configured to read data from external memory and may be configured to write data to the external memory. Such data may be encrypted with a secret key held only inside the enclave.

The TEE 250 may be implemented using various platforms such as Trusted Platform Module (TPM) or Intel Software Guard Extensions (SGX). SGX, for example, supports remote attestation, which enables an enclave to acquire a signed statement from the processor that is executing a particular enclave with a given hash of member known as a quote. A third-party attestation service such as Intel Attestation Service (IAS) may certify that these signed statements originate from authentic CPUs conforming to the SGX specification.

While nodes that act as congress members and nodes that act as non-hub participants in a payment channel may include TEEs, at least some nodes that act as hubs may not have TEEs 250. In other words, nodes acting as payment channel hubs are not required to run TEEs in order to participate in (and be protected by) the failsafe mode.

The electronic device 200 acts as a node 102 (FIG. 1) in the blockchain network 100 (FIG. 1). Some nodes may join and otherwise take part in a congress 110 (FIG. 1). A congress 110 is formed when a group of digital asset bearers pool digital assets, such as digital currency, tokens or other stake or value supported by the blockchain network 100 (FIG. 1). The congress may, for example, implement a failsafe mode associated with a payment channel. For example, if a hub fails, the congress may trigger the failsafe mode to facilitate the orderly closing of payment channels and/or to facilitate further off-chain transfers of value (i.e., off-mainchain transfers of value).

Some nodes may take part as non-hub participants in a payment channel. Such nodes may, for example, establish a payment channel with a hub or with other non-hub participants. Techniques for setting up a payment channel will be described below and techniques for implementing a failsafe mode when a hub or payment channel fails will also be described.

Other nodes may not take part as non-hub participants or may not act as congress members. Such nodes may, instead, function as one or more of miners, validators, hubs, or may provide other functions associated with the blockchain network.

Participating in a Payment Channel and Responding to Channel Failure

Figure 3:
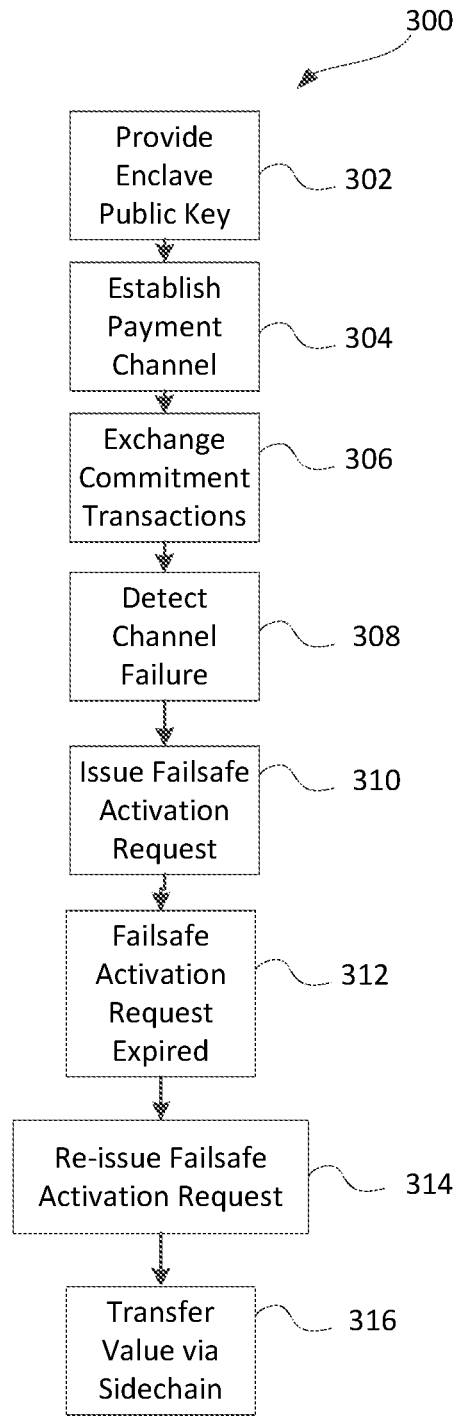
FIG. 3 is a flowchart of an example method of issuing a failsafe activation request.

Referring now to FIG. 3, a method 300 for participating in a payment channel and for responding to channel failure is illustrated. The method 300 may be performed by a node 102 of the blockchain network. Such a node 102 may include computer-executable instructions stored in memory 220 (FIG. 2) which implement the method 300. Such instructions, when executed by a processor 210 (FIG. 2), cause a node 102 (such as an electronic device 200 of the type described with reference to FIG. 2) to perform the method 300.

At operation 302, a node performing the method 300 and, more particularly, an enclave associated with a TEE 250 (FIG. 2) at a node 102 performing the method, provides an enclave public key to a hub that is to be involved in a payment channel. The enclave public key is a public encryption key that is associated with an enclave private key stored securely in the enclave. The enclave public key allows the hub to communicate directly with the enclave. That is, the hub uses the enclave public key to encrypt communications to the enclave.

The enclave public key may be provided directly to the hub by the node performing the method or it may be provided to the hub by including the enclave public key as metadata in a funding transaction which will be referred to below with reference to operation 304. Accordingly, while operations 302 and 304 are illustrated using separate blocks in the flowchart of FIG. 3, operation 302 may be performed as part of operation 304 of the method 300 of FIG. 3.

At operation 304, the node performing the method 300 establishes (i.e. sets up) a payment channel with the hub. More particularly, the payment channel may be established by broadcasting, to a blockchain network, a funding transaction which encumbers a digital asset with a first public key, a second public key and a third public key such that the encumbrance of the digital asset may be removed by: 1) both a first signature generated from a first private key corresponding to the first public key and a second signature generated from a second private key corresponding to the second public key; or 2) a third signature, valid for the third public key, alone. The third public key is a public key that is associated with a group, such as a congress 110 (FIG. 1). For example, the third public key may be a group public key (which may also be referred to as a congress public key). The first public key is associated with the node performing the method 300 and the second public key is associated with another node, such as the hub, that is a participant in the payment channel that is to be set up.

Thus, the funding transaction is set up so that the two parties to a payment channel can mutually remove the encumbrance on digital assets associated with the funding transaction, or a congress, acting alone, can remove the encumbrance. That is, the funding transaction is set up so that the encumbrance can be removed in one of two ways. If the parties to the payment channel wish to cooperate, the encumbrance could be removed if they both use their respective private key (i.e., the private keys associated with the first public key and the second public key) to generate a signature for a transaction that would spend the encumbered digital assets. Under this scenario, their valid signatures, taken together, remove the encumbrance. The second way in which the encumbrance may be removed involves a plurality of members of a congress cooperating to generate a signature on behalf of the congress which is valid according to a threshold signature scheme. The threshold signature scheme will be discussed in greater detail below in the detailed discussion of congresses. Generally, the threshold signature scheme requires cooperation of a number of congress member nodes that control at least a threshold number of key shares. Since a congress is secured by deposit of stake, the member nodes of the congress risk confiscation of such stake if they act contrary to a congress protocol. For example, if a congress member were to contribute a partial signature to a transaction that would effectively steal the digital assets associated with the funding transaction of operation 304, the congress member would risk having their deposit revoked by an honest congress members controlling at least a threshold of key shares.

As noted above in the discussion of operation 302, the funding transaction that is broadcast at operation 304 of the method 300 may include, as metadata of the funding transaction, a public key associated with a TEE of the node performing the method. For example, an enclave public key may be specified as metadata in the funding transaction.

After setting up the payment channel, the node performing the method 300 is connected to the hub by a payment channel that forms one spoke of a hub-and-spoke payment network and can exchange value with other nodes (i.e., via other "spokes") connected to the hub via other "spokes" and, if desired, with the hub itself. For example, the node can now transfer value with other non-hub nodes off-chain by transferring (at operation 306) tokens through the hub. More specifically, value may be transferred through the exchange of commitment transactions with the hub and one or more "value" which invalidates previous commitment transactions. A commitment transaction may, at operation 306, be received at the enclave of the node performing the method 300 in an encrypted format. For example, the received commitment transactions may be encrypted with the enclave public key so that the commitment transactions remain secure within the enclave. The enclave, therefore, sees all commitment transactions which are sent by the hub and is, therefore, always aware of the latest channel state. The enclave may decrypt the commitment transaction to determine a balance associated with the channel and to determine a value associated with a breach remedy transaction. This value is a previously secret value associated with a previous commitment transaction and the value may be used in a breach remedy transaction if a counter party (such as the hub) breaches a protocol by attempting to broadcast an outdated commitment transaction to a blockchain network.

Commitment transactions may generally be exchanged in the manner described in the Lightning Network. Commitment transactions may be exchanged together with a value that effectively invalidates a previous channel state. That is, the value effectively renders older commitment transactions unusable. Any attempt to broadcast an old (i.e., not current) commitment transaction by a dishonest participant may prove unwise since the value that invalidates the previous channel state may be used by an honest participant to penalize the dishonest participant (e.g., by claiming all funds in the channel).

If a payment channel continues to function as intended, the payment channel may be closed at any time by mutual agreement of the parties to the payment channel. Recall that the funding transaction which was used to fund the payment channel was configured such that both parties to the payment channel (e.g., the node performing the method 300 and the hub) can remove the encumbrance on digital assets by cooperating in a 2 of 2 multisignature protocol. Thus, these nodes may cooperate to generate respective signatures for a transaction that would close out the payment channel and redistribute the digital assets previously encumbered by the funding transaction. That is, these nodes may simply redistribute the funds in a manner that accounts for the current state of the payment channel without having to necessarily rely on commitment transactions. The commitment transactions may, however, be needed if the counter party becomes uncooperative, refusing to sign such a transaction.

As noted previously, a payment channel may fail in certain circumstances, which may be detected by the node at operation 308. For example, a hub may fail, and such failure may be detected by the node at operation 308. The failure of a hub may be detected, for example, when the hub fails to provide an expected commitment transaction to the enclave in response to a request to update the channel.

In response to detecting the failure of the hub, the node may, at operation 310, issue a failsafe activation request to the group (i.e., the group or congress associated with the third public key). The failsafe activation request may be issued to the group by automatically posting the failsafe activation request online in response to detecting the failure of the hub. For example, the failsafe activation request may be submitted to a web server which acts as a central repository for failsafe activation requests and which member nodes of the group are configured to monitor. The failsafe activation request may be generated within the enclave and signed using an enclave private key associated with the enclave public key.

The failsafe activation request is issued to the group using data from the enclave. For example, the data that is used to generate the failsafe activation request may be based on a commitment transaction received during operation 306. For example, the failsafe activation request may include a signed statement of the current state. The current state of the payment channel is the balance of the payment channel, and the status, state or balance defines the allocation of digital assets when a most recent commitment transaction associated with a payment channel is taken into account.

The failsafe activation request may also include other information. For example, the failsafe activation request may specify a fee that is offered by the node for closing the payment channel. The failsafe activation request may also include freshness data, such as a timestamp. The timestamp or other freshness data may specify the date and/or time when the failsafe activation request was generated or issued by the TEE. Alternatively, the timestamp may specify a block number of a most recent block added to the blockchain of the blockchain network. The group of nodes that processes the failsafe activation request may be configured to disregard a failsafe activation request that is determined to be expired based on the timestamp. For example, where the timestamp is expressed as the most recent block number, the group may disregard a failsafe activation request that is determined to be expired based on the block number specified in the failsafe activation request and based on a current block number of the most recent block added to the blockchain. That is, the group may assess the freshness of the failsafe activation request based on the number of blocks that have elapsed since the failsafe activation request was issued.

The node performing the method 300 may be configured to re-issue (at operation 314) the failsafe activation request if it has expired (as determined by the node at operation 312) and if a failsafe mode has not been implemented and if the payment channel has not resumed operation in the interim. That is, if the group has not implemented the failsafe mode and if the payment channel remains inoperable, an expired failsafe activation request may be re-issued at operation 314. More particularly, a further failsafe activation request may be issued to the group. The further failsafe activation request includes new freshness information such as a block number for a new most recent block added to the blockchain.

After a failsafe mode has been activated by the congress (in response to observing sufficient failsafe activation requests as will be described in greater detail below), the congress may close the payment channel(s). For example, nodes of the congress may cooperate to generate a signature for a transaction affecting the digital assets encumbered at operation 304. The signature is valid for the third public key referred to above in the discussion of operation 304. That is, the signature is valid for the group/congress public key that encumbered the digital assets. Since the payment channel was set up to allow the congress to assume control over the digital assets included in the funding transaction, the congress can facilitate the closing transaction if the payment channel fails.

In at least some instances, before the channel is closed by broadcast of a closing transaction to the blockchain network, a temporary sidechain may be deployed in response to the failsafe activation request (and, more particularly, in response to a number of failsafe requests sufficient to trigger the failsafe mode). This temporary sidechain may be referred to as a ghost chain and it will be described in greater detail below. The temporary sidechain may be used by the node, at operation 316 of the method 300, to exchange (e.g., transfer or receive) value with another node through the sidechain. By way of example, the node may transfer value to another node by broadcasting a sidechain transaction to miners of the sidechain that was deployed in response to the failsafe activation request. The sidechain transaction transfers value to or from another node. That is, the sidechain transaction effectively updates a balance of digital assets associated with the node. The sidechain may be used to transfer value to or receive value via other "spokes" (i.e., other payment channels) for other nodes that previously established payment channels with the failed hub. Thus, the sidechain may be used to allow nodes that were previously connected to the hub to continue to transact with one another while they wait for their channel to be closed. A further request to close the channel may not be required after the failsafe is activated; all channels that issued a failsafe activation request will be closed when the sidechain terminates.

Where a sidechain is deployed, a node may later issue a request to the congress to commit the state of a payment channel to the main blockchain (which may be referred to as the mainchain). Nodes of the congress may then cooperate to generate a valid signature for a closing transaction that accounts for any sidechain transactions affecting the balance.

Accordingly, when a payment channel fails (e.g., due to failure of a hub), a group of nodes that are members of a congress may cooperate to facilitate the closing of the payment channel. Congresses and various functions of the congress will be described in greater detail in the description below.

Congresses and Threshold Signatures

A congress 110 may be a permissioned or non-permissioned group of nodes 102 operating in a blockchain network. That is, the congress 110 may be joined by a node 102 (FIG. 1) in the blockchain network 100 (FIG. 1) (e.g., by any node that monitors and stores at least a portion of the information in the blockchain). To join the congress 110, a node 102 transfers one or more digital assets to a digital asset pool associated with the congress 110 (i.e., to a public group address associated with one or more digital assets which are, in turn, associated with other members of the congress). This digital asset pool may be referred to as a congress pool. For example, a node 102 may join a congress 110 by transferring (i.e., depositing) such digital assets to an address associated with the congress pool (i.e., to a "congress address" which may also be referred to as a public group address). The digital assets are placed under the control of a group threshold signature with a single public key, referred to as a congress public key. Congress members hold distributively-generated private key shares (i.e., private key shares that are generated at the various nodes that hold such private key shares). The number of shares held may be in proportion to the amount deposited in the pool.

The digital assets that are controlled by the congress 110, which include any digital assets transferred to the congress address (i.e., to a congress public key, which is a public key associated with the congress), are placed under the control of a threshold signature scheme. Under the threshold signature scheme, a group of members whose total private key shareholdings exceed a threshold are needed to produce a valid signature which allows the digital assets to be transferred away from control of the congress 110. That is, at least a threshold number of private key shares must be used to generate a valid signature for any outgoing transfer of digital assets controlled by the congress 110.

The congress public key encumbers the digital assets deposited in the congress pool by the members of the congress 110 in return for private key shares, and any digital assets deposited to the address associated with the congress pool (i.e., placed under full, partial or conditional control of the congress) by members or non-members of the congress 110 which have been deposited (i.e., encumbered by the congress public key) for reasons other than obtaining private key shares. Non-members or members may encumber digital assets with the congress public key for various reasons. For example, as noted above with reference to FIG. 3, a funding transaction for a payment channel may encumber digital assets using a congress public key. By encumbering such digital assets (i.e., digital assets used to open a payment channel) with a congress public key, the congress may implement a failsafe mode if a payment channel fails (e.g., if a hub associated with the payment channel becomes non-responsive).

Since the same congress public key may encumber both member deposits (i.e., digital assets provided by congress members in return for private key shares) and digital assets provided by members or non-members for other purposes, at least some deposits to the congress public key may be specially flagged to indicate the type of deposit. For example, a transaction that transfers the digital asset to the congress address may include a flag, identifier or other attribute which indicates the nature of the deposit being made. By way of example, a transaction that transfers the digital asset to the congress address that is not made for the purpose of joining a congress or boosting a stake in congress membership may include a special identifier to indicate that the deposit is being made for another purpose. Such identifiers may be used by nodes 102 associated with the congress 110 when managing private key share generation (which will be discussed in greater detail below). More particularly, nodes 102 which deposit\encumber digital assets for the purpose of joining the group are allocated private key shares for the congress 110 (as a result of making the deposit of digital assets) while other nodes 102 which encumbered digital assets for other purposes (e.g., to open a payment channel) may not hold congress private key shares for the congress (i.e., corresponding to the congress public key).

The congress 110 may act as a self-governing group in which cooperative behaviour is enforced through the threat of confiscation of all or part of the member deposit. Non-cooperative or malicious members may have such digital assets confiscated by participation in a cooperative protocol by a number of honest members. Further, when a congress member wishes to leave the congress 110, they may withdraw their member deposit (i.e., request that the congress 110 transfer the member deposit back to that member's personal address). However, withdrawal of funds is only performed if a number of private key shares exceeding a threshold required to generate a valid digital signature are used by TEEs, associated with members of the group (i.e., the congress) to generate partial signatures to approve the withdrawal.

The threshold signature scheme implemented by the congress 110 may be of various types. The threshold signature scheme allows distribution of signing power between n parties as long as at least a threshold number of private key shares have contributed towards generating a valid signature. Any subset smaller than the threshold cannot generate a valid signature and cannot generate any usable information with regard to the signature. More particularly, each of the parties controls a share of a private signing key and a threshold number of key shares must be used to generate a valid signature through the combining of partial signatures. Any subset of key shares that is less than the threshold cannot generate a valid signature through the combination of partial signatures.

The threshold signature scheme may be an Elliptic Curve Digital Signature Algorithm (ECDSA) scheme. For example, an ECDSA scheme may be of the type proposed by Ibrahim et al. in "A robust threshold elliptic curve digital signature providing a new verifiable secret sharing scheme," 2003 EIII 46th Midwest Symposium on Circuits and Systems, 1:276-280 (2003). This threshold signature scheme is an extension of a digital signature scheme which is an elliptic curve cryptography based algorithm in which t+1 key shares from a party of n key shareholders are required to reconstruct a private key. The scheme may be used to construct a valid signature without having to reconstruct a private key and without any party having to reveal their key share to another party.

Since t+1 key shares are sufficient to reconstruct the secret, the maximum number of permissible adversaries according to this technique is t. An adversary, in the model of Ibrahim, et al. is an entity who has corrupted a party holding a secret share and has access to that secret share. Adversaries can be of various types. For example, a Byzantine adversary is an adversary who may pretend to participate in a protocol while they are, in fact, sending incorrect information. The ECDSA scheme proposed by Ibrahim is robust against up to $t \leq n/4$ malicious adversaries. This robustness could rise to $t \leq n/3$, but at the cost of greater complexity.

The ECDSA scheme of Ibrahim et al. is robust against halting $t \leq n/3$ halting adversaries. A halting adversary is able to prevent a corrupted party from participating in a protocol or halt participation part-way through.

This ECDSA scheme includes various mechanisms which could be used by the nodes 102 to identify a malicious or uncooperative party. For example, verifiable secret sharing (VSS) may be used to share a polynomial required for Shamir's Secret Sharing (SSS). SSS is a form of secret sharing in which a secret is divided into parts and provided to each participant in its own unique part. These parts may be used to reconstruct the secret. VSS may be used, by the nodes 102, to identify a malicious node 102 or member if inconsistent shares are provided to different nodes 102 or if a share is secretly sent to a node that is different than the blinded share which is broadcast to all nodes. Inconsistent shares may be identified by any one of the nodes 102. The sharing of the secret may be made verifiable by including auxiliary information which allows nodes 102 to verify their shares as consistent.

The sending of an incorrect share to an individual node (i.e., a share that is different than the blinded share that is broadcast) can be identified by the intended recipient node of the share. The identification of an incorrect share being secretly sent to a node can be rendered publicly verifiable using techniques of Publicly Verifiable Secret Sharing (PVSS). Such techniques may avoid a possible delay in the identification of a cheating sender which might occur where PVSS is not used, and a recipient of an incorrect share is offline or cut off from a substantial fraction of the network when the incorrect share is sent.

Misbehaviour, such as providing inconsistent shares to different nodes, may be addressed by a congress 110 to deter malicious behaviour. For example, when a node 102 (FIG. 1) is identified by other nodes 102 as a malicious party, a number of nodes 102 (i.e., nodes associated with congress members) exceeding a threshold (e.g., t+1) may cooperate to penalize the malicious party. For example, the nodes 102 may take action involving a digital asset (such as digital currency, tokens or other stake or value) deposited to the congress by the malicious party. For example, the congress may burn the digital currency, tokens, stake or value by transferring them to an unspendable address or the congress may confiscate such digital assets by reaching consensus on a decision not to authorize their return to the malicious party. The nodes 102 that are not a misbehaving node may also deter misbehaviour by cooperating to exclude a misbehaving node (e.g., by effectively invalidating key shares; for example, by excluding a node from participating in the congress protocol, or by re-sharing the private key and not allocating the misbehaving node a share).

The ECDSA technique described above may be enhanced through the use of a TEE. For example, the threshold ECDSA signature technique based on Ibrahim et al. contemplates a strong form of adversary, referred to here as a Byzantine adversary. This type of adversary may behave arbitrarily, for example, they not only refuse to participate in the signing process or halt party way through, but may also pretend to honestly participate and send incorrect information. However, by using TEEs, and producing the data used for signing within an enclave of a TEE where a secret private key share is stored, additional security may be provided since it is highly unlikely that enclaves could be compromised in significant numbers. If each TEE is allocated no more than one key share, for example, the number of possible compromised TEEs could reasonably be expected to not approach the threshold for robustness against Byzantine adversaries, assuming n to be sufficiently large. This allows the protocol to be secure if it is tolerant to a small number of malicious adversaries relative to the total number of key shares.

For example, if all nodes of a congress have TEEs, acquisition of a secret stored within an enclave could only be achieved with physical access to a node and only at great effort and expense, provided the manufacturer of the TEE is not corrupted. Such manufacturer-level corruption is expected to be manageable. For example, if a manufacturer were to falsely claim that a number of public keys correspond to genuine TEEs, they could gain direct access to private key shares and potentially launch an attack. However, such an attack would require a sufficient number of key shares to allow the manufacturer to produce a valid signature without assistance from other nodes. This would mean accumulating a large portion of the total stake, can be assumed to be prohibitively expensive. Moreover, by carrying out the attack, a significant percentage of the value of the necessarily vast stake holding would be destroyed.

When TEEs are used, it is useful to contemplate the robustness of the protocol to "corrupted nodes". A corrupted node is a node such that the hardware external to the TEE is corrupted, but the integrity of the TEE is not compromised. A corrupted node may have control over what information the enclave receives and does not receive. In particular, a corrupted node may halt i.e., refrain from participation in the protocol. If information provided to the protocol is required to be signed by a private key held secretly in the enclave (where the corresponding public key was authenticated during attestation) the private key is as trustworthy as the enclave itself. Hence, a corrupted node cannot send arbitrary (authenticated) information to the protocol and may only attempt to interfere by halting or attempting to fool the enclave into acting improperly, for example, by providing it with outdated information. It follows that, for corrupted nodes, a successful attack would require gathering of a sufficient number of partial signatures to produce a full signature. With TEEs, the protocol of Ibrahim et al. is robust against $2t$ corrupted nodes. Because a signature can be produced if $n-2t>=2t+1$, any qualified subset of key shares of size $2t+1<=(n+1)/2$ is sufficient. Accordingly, when TEEs are used, a threshold for the threshold signature scheme may be configured to be a number that is greater than or equal to 50% of the key shares to produce a valid signature in the presence of corrupted nodes.

Other threshold signature schemes may also be used. For example, the threshold signature scheme may be an ECDSA threshold scheme of the type proposed by Goldfeder et al., "Securing Bitcoin Wallets Via a New DSA/ECDSA threshold signature scheme," (2015). This protocol allows $t+1$ parties to produce a valid signature. Consequently, the number of key shares an adversary has to control to produce a valid signature is equal to the number of key shares an adversary has to possess to reconstruct the private key. This technique can provide an efficient scheme in the case in which unanimity is required to produce a valid signature. In the most general case, this scheme imposes space requirements that scale exponentially with the number of congress members since, for an arbitrary threshold one needs to repeat the whole protocol for any possible subset of $t+1$ players out of n. Thus, for large values of both n and t, a large number of key shares will need to be stored. To mitigate such storage requirements, standard bitcoin multi-signatures could be combined with threshold signatures. In particular, digital assets could be locked using multi signature so that each private key is divided into shares. This technique would make larger congresses more efficient in terms of space requirements. Scaling properties may also be improved by composing a scheme for a large number of participants out of smaller party sizes, at multiple levels, in an iterative fashion. For example, the threshold signature scheme could be combined with techniques of Cohen et al., *Efficient Multiparty Protocols via Log-Depth Threshold Formulae* (2013), Advances in Cryptology—CRYPTO 2013, pp. 185-202.

Other threshold schemes may be used including non-ECDSA signature schemes. For example, a threshold scheme based on a Schnorr scheme may be used by the nodes 102 to implement the congress 110.

Nodes 102 (FIG. 1) in the blockchain network 100 (FIG. 1) may implement a congress protocol based on the selected threshold signature scheme. Such nodes 102 may include computer-executable instructions stored in memory 220 (FIG. 2) which implement the congress protocol. Such instructions, when executed by a processor 210 (FIG. 2), cause a node 102 (such as an electronic device 200 of the type described with reference to FIG. 2) to perform one or more methods of the congress protocol. Such methods may include any one or combination of the methods 400, 500, 600, 700, 800, and 900 of FIGS. 4 to 9. Thus, the congress protocol may include one or more of the methods 400, 500, 600, 700, 800, and 900 of FIGS. 4 to 9. The methods may be performed by a node cooperatively with other nodes associated with other congress members.

Joining a Congress

Figure 4:
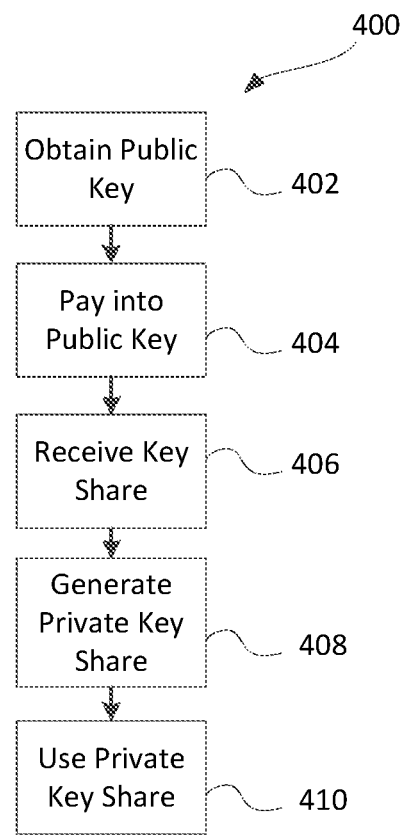
FIG. 4 is a flowchart of an example method of joining a congress.

Reference will now be made to FIG. 4 which illustrates a method 400 of joining a congress. The method may be performed to join a pre-existing congress. That is, the method 400 may be used to join a congress that has been previously initiated.

The method 400 of FIG. 4 includes, at operation 402, obtaining a congress public key. The congress public key may be obtained from a party that is a pre-existing member of the congress or it may be obtained from a third party including, for example, a third-party system operating outside of the blockchain network 100 (FIG. 1). For example, the congress public key may be obtained from a public web server accessible over the public Internet. By way of further example, the congress public key may be observed on the blockchain; for example, observed based on metadata included in at least some transactions that transfer digital assets to the congress public key.

The node 102 performing the method 400 pays into the congress public key at operation 404 by broadcasting a transaction of digital assets from a private account associated with the node 102 to a congress address (i.e., an address associated with the congress public key). More particularly, the node 102 broadcasts a transaction to transfer one or more digital assets to a public group address that is associated with the congress public key. The public group address is the address for a congress pool. The congress pool includes other digital assets associated with the other members of a congress. Thus, the transaction at operation 404, once added to a block by a miner 104 (FIG. 1) and after the block is confirmed, transfers the digital asset to the congress pool which includes digital assets from other members. The public group address may receive both transfers from parties wishing to join the congress and transfers from parties not wishing to join the congress. The parties who do not wish to join the congress transfer the digital assets to the congress pool so that such digital assets may be placed under total, partial or conditional control by the congress using a threshold signature scheme employed by the congress. For example, as noted above with reference to FIG. 3, the congress public key may encumber digital assets associated with a funding transaction that opens a payment channel.

The transaction at operation 404 may include a flag, identifier or other attribute which indicates that the party transferring the digital asset wishes to join the congress and that the deposit is being made for such purpose.

After depositing the digital assets with the congress pool, the node 102 performing the method 400 receives, at operation 406, a private key share. Then, the node 102 regenerates the private key share at operation 408 by running a single instance of the protocol. The generation of a private key share may be performed within a TEE of the node 102.

At operation 408, the node 102 generates a private key share that is to be used in a threshold signature scheme in which at least a threshold of private key shares must be used to generate a valid signature for a transaction on behalf of the congress. Other holders of private key shares are the other members of the congress who have joined the congress on a permissioned or non-permissioned basis by transfer of respective digital assets to the public group address.

To regenerate the private key shares, at operation 408, the existing congress members may cooperate to update the key shares. For example, a node 102 may generate a random polynomial of order t and with the constant term zero $f_{n+1}^0(n)$. The node 102 may then calculate the point $f_{n+1}^0(n+1)$ and set this as their private key share. The node 102 may then distribute the points on this polynomial $f_{n+1}^0(i)$ to each of the existing congress members, i=1, . . . , n. Each existing congress member (i=1, . . . , n) then adds the received value to their existing private key share to obtain the new private key share. The node 102 now has a private key share equivalent to all other members and the corresponding public key remains unchanged. As described above, the threshold signature scheme may be of various types including an Elliptic Curve Digital Signature Algorithm or a threshold scheme based on a Schnorr scheme.

The private key share may be generated within a TEE 250 (FIG. 2) and may be securely stored on the node 102. For example, the private key share may be stored in the TEE 250.

After the private key shares are generated by respective nodes, funds under control of the previous congress public key (e.g., funds transferred to the public group address that is associated with the original congress public key) may be transferred (through cooperation of a number of group nodes sufficient to generate a valid signature under the threshold signature scheme) to a new congress public key associated with the new private key shares. However, in other embodiments, a node may join a congress in a manner that does not require a new congress public key to be defined. Instead, the same congress public key may be used, and TEEs associated with congress nodes may be used to cooperate to allow the node joining the congress to generate a private key share corresponding to the existing congress public key.

After the private key share is generated at operation 408, it may be used at operation 410 of the method 400. The private key share may be used to cooperatively generate a valid signature for a transaction from the public group address which may be broadcast by a member. That is, the private key share may be used in the threshold signature scheme to contribute towards signature generation. Under the threshold signature scheme, a threshold number of private key shares of the congress are required to be used by respective members to produce a valid signature which allows the digital assets to be transferred away from the congress. The node 102 performing the method 400 may retrieve the private key share from storage and use the private key share in order to contribute towards signature generation. If a sufficient number of other congress members also use their respective private key to contribute towards signature generation, the signature is generated, and a valid outgoing transaction may be broadcast. When a miner 104 (FIG. 1) of the blockchain network 100 adds the transaction to a mined block which is added to the blockchain by consensus of the nodes 102 in the blockchain network 100 and the block is confirmed, the outgoing transaction is complete. At this point, the digital assets represented in the transaction may no longer be under the control of the congress. That is, such digital assets may no longer be encumbered by the congress public key.

The use of the private key share at operation 408 may be performed within a TEE of the node 102. The TEE protects the private key share such that other parts of the system nor the member themselves cannot access any data stored in an enclave, such as the private key share. Further, the TEE protects the private key in that, assuming the integrity of the TEE is maintained, it cannot retain a copy of the private key if the member wants their deposit back since it must attest to the deletion of the private key before the member deposit is returned. In addition, use of TEEs when a congress serves as a bonded validator set for a proof-of-stake sidechain can also ensure that partial signatures are provided (by the TEE to the node) if and only if a consensus is reached on the sidechain that the transaction should indeed be signed.

The transaction at operation 410 may transfer the digital asset back to the party which originally deposited those digital assets to the congress pool. That is, the transfer may return digital assets to a depositor. The transfer may also transfer the digital asset elsewhere. For example, the digital asset may be transferred to a third party or to an unspendable address. In some cases, one or more digital assets that were encumbered by the congress public key in a funding transaction to open a payment channel may be redistributed by a transaction on the authorization of a congress.

Confiscation of Digital Asset

Figure 5:
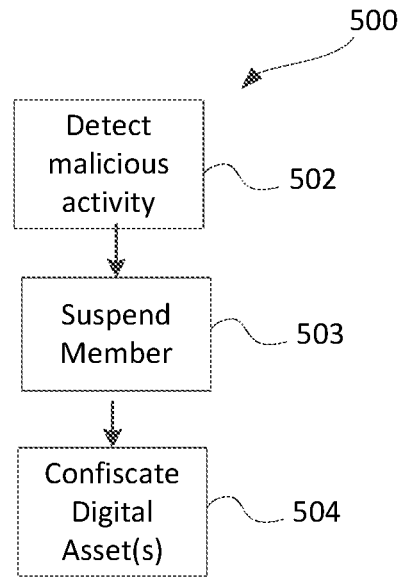
FIG. 5 is a flowchart of an example method of confiscating a digital asset.

Referring now to FIG. 5, an example method 500 of confiscating a digital asset is illustrated. The method 500 of FIG. 5 may be performed by a node 102 that has previously joined a congress, which may be the same node performing the method 400 of FIG. 4. The method 500 may be performed after operation 408 of the method 400 of FIG. 4 so that the node 102 performing the method 500 already has access to a private key share when the method 500 of FIG. 5 is performed.

At operation 502, the node 102 detects malicious activity by a malicious party. The malicious party may be another member of the congress. Malicious activity is detected when the node 102 determines that a member of the congress is in breach of a pre-defined protocol or criteria. For example, when a node which is a member in the congress reports faulty information (i.e., false, inconsistent, or otherwise unacceptable information) to other members of the congress, the member may be deemed to be a malicious member. By way of further example, when a node which is a member of the congress proposes a transaction that would fraudulently transfer away digital assets encumbered by a congress public key (such as digital assets encumbered by a congress public key in a funding transaction to open a payment channel), other honest nodes may act to penalize the member deposit of the fraudster node.

At operation 503, in response to detecting malicious activity, the node 102, in cooperation with other nodes in the congress, may suspend the member that is the malicious party. That is, the congress may exclude the malicious party from further participation in the congress.

To ensure that all nodes 102 operate in conformity with the pre-defined protocol or criteria, member deposits into the congress pool may be subject to confiscation. Confiscation means permanently preventing the return of a member deposit that is deemed confiscated. The digital asset(s) that form the member deposit which are not returned due to the malicious activity may be left in the congress pool but not returned, transferred immediately or in the future to another unspendable address, or otherwise confiscated and the nature of confiscation may depend on whether the congress functions as a bonded validator set for a sidechain. For example, at operation 504, in response to detecting malicious activity by a malicious party, the node 102 performing the method 500 may use the private key share to provide a partial signature on a confiscation transaction. That is, the node cooperates with other nodes of the congress to confiscate at least a portion of the digital assets that were previously transferred to the public group address (i.e., to the congress pool) by the malicious party. That is, in response to observing that the group member is in breach of the pre-defined protocol or criteria, the private key share is utilized to contribute to the authorization of a transaction of one or more digital assets that are associated with that group member and that are held in the congress pool.

Since a threshold signature scheme is used with the congress public key, an individual node acting alone cannot transfer another congress member's deposit of digital assets away from the congress pool (e.g., to an unspendable address). Rather, the digital assets can only be confiscated by transfer when a threshold number of private key shares are used by their respective members to generate a valid signature to transfer the digital asset(s) to another address or when a group of members having at least a threshold number of private key shares reach consensus to suspend a member (at operation 503), which causes any withdrawal request from the suspended member to be automatically ignored. When digital assets are confiscated by transfer, the other address to which the digital asset(s) may be transferred may be associated with an unspendable address. For example, the other address may be an address for which no private key exists so that no party can access the digital assets bound by the public key for the address. When the digital assets are transferred to the unspendable address they may be considered to have been burned, since they are no longer spendable by any members of the congress or indeed by any nodes in the blockchain network 100.

Accordingly, at operation 504, the node may confiscate the digital asset by using the private key share in cooperation with other members of the congress to generate a valid signature for the transaction to the unspendable address.

Further, in some implementations, a congress may serve as a bonded validator set, securing a proof-of-stake sidechain (including a ghostchain, which will be described in greater detail below), and this sidechain may be used as a broadcast channel. For example, a consensus may be reached by the congress members on the sidechain that a member has acted maliciously. This consensus could correspond to confirmation of a sidechain transaction containing incriminating evidence of the malicious activity. When consensus is reached, any request to withdraw a member deposit, made by the malicious member, will be denied and the deposit is considered to be confiscated. All or a portion of the confiscated digital assets may be burnt at some time in the future. That is, at some time later, a threshold of members (not including the malicious member) may collaborate to authorize transfer of the confiscated digital assets to an unspendable address. Some or all of the digital assets may, instead, be sent as a reward to a node who provided evidence of a member's wrongdoing.

Since the congress is an open group which may be joined by any node 102 of the blockchain network 100 through deposit of digital assets, the group membership may periodically change. When such changes occur, the private key share distributions may be updated.

Updating Private Key Share Distributions Using New Public Address

Figure 6:
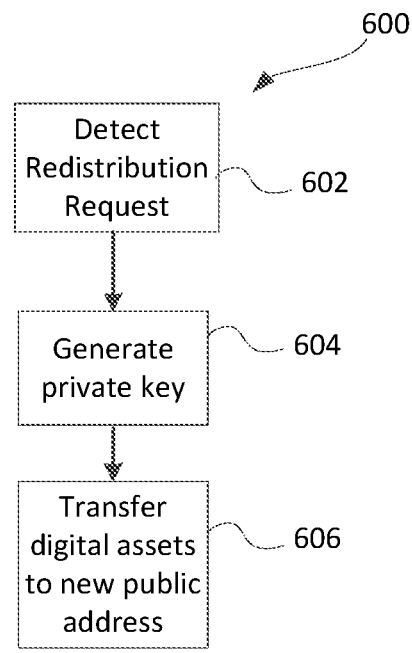
FIG. 6 is a flowchart of an example method of redistributing key shares.

Referring now to FIG. 6, an example method 600 of updating private key share distributions is illustrated. The method 600 may be performed by a node 102 of the blockchain network 100 in cooperation with other nodes of the blockchain network 100.

At operation 602 of the method 600, the node 102 detects a redistribution request, which is a request, the fulfilment of which entails a redistribution of key shares. For example, the node 102 may detect that a prospective new member has transferred digital assets into the public group address or that an existing member has requested withdrawal of a member deposit.

Digital assets may be transferred to the public group address (i.e., to the congress pool) by nodes requesting to join the congress or increase their participation in the congress and by other nodes who are not requesting to join the congress but are instead transferring the digital assets to the congress for another purpose (such as to transfer the digital assets to a sidechain, as will be described below). At operation 602, the node 102 may identify congress members (i.e., the parties that transferred digital assets to the congress public key to join the congress and not for another purpose) using one or more attributes included in at least some of the transactions of digital assets to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

In response to detecting the request at operation 602, the fulfilment of which, entails the redistribution of key shares, at operation 604, a new private key share is generated by the node 102 in a manner similar to the manner that the private key share was generated at operation 408 of the method 400 of FIG. 4. Other member nodes of the congress also generate respective private key shares. These private key shares may be used with the threshold signature scheme for the new congress public key. Members who will leave the congress at this point do not generate new private key shares during operation 604 and, since they will not be allocated a private key share for use with the new congress public key, they lose the capacity to take part in the congress and are no longer considered congress members.

Further, in response to detecting a redistribution request (which is a request, the fulfilment of which, entails the redistribution of key shares), at operation 606, the node 102 collaborates with other congress members to transfer all digital assets in the public group address to a new public address associated with a new public key (which will then become the new congress public key).

Thus, according to the method 600 of FIG. 6, when the distribution of deposits changes or when a request is received from a member to withdraw a deposit, private key shares may be regenerated and all of the digital assets under control of the congress may be moved to a new public key.

The frequency with which memberships of a congress can be updated is limited by the block time of the blockchain network 100. Many applications may only require rebalancing at low frequencies (i.e., frequencies that are low compared to the frequency at which blocks are mined on the proof-of-work mainchain).

Figure 7:
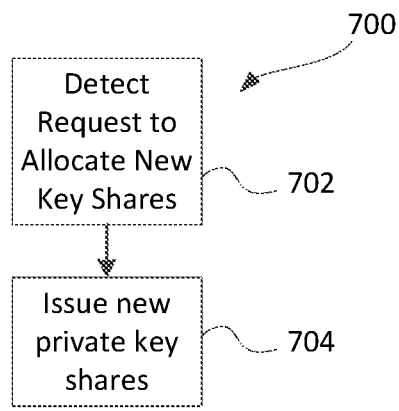
FIG. 7 is a flowchart of a further example method of redistributing key shares.

Updating Private Key Share Distributions while Retaining Existing Public Group Address Referring now to FIG. 7, a further example method 700 of updating private key share distributions is illustrated. The method 700 may be performed by a node 102 of the blockchain network 100 in cooperation with other nodes of the blockchain network 100.

In the method 700 of FIG. 7, the congress public key does not change each time the distribution of member deposits changes. When a request to allocate a new key share is detected (at operation 702, which may occur through deposit of digital assets to the public group address), the node 102 collaborates with other members of the congress to issue (at operation 704) new private key shares for the same public key to the new members of the group. The number of nodes that collaborate is at least the threshold number of nodes required to generate a digital signature under the threshold signature scheme. At operation 704, an additional key share may be allocated while other key shares remain the same. This may entail a change in threshold (of the threshold signature scheme), although the change may in practice be small. Alternatively, at operation 804, an additional key share may be allocated while other key shares are renewed. Such renewal is required to be accompanied by the attestation to deletion of any key shares of the previous generation. In this case, new shares may be allocated while maintaining the same threshold (in the context of SSS, this involves sharing on a new polynomial, of increased order).

At operation 702, the node 102 may identify congress members (i.e., the parties that transferred digital assets to the congress public key to join the congress and not for another purpose) using one or more attributes included in at least some of the transactions of digital assets to the public group address. For example, certain transactions may be flagged as special transactions using an attribute in the transactions. Such attributes (or the presence or absence thereof) may indicate a purpose for which the transfer is made. For example, a flag may be included in a transaction when the transferor is not requesting to join the congress.

When members leave a congress which uses the method 700, they may securely delete their private key share. In order to ensure that private key shares of old members are unusable, the members of the congress may be required to use nodes 102 having a special TEE. The TEE is an architecture implemented at the hardware level which guarantees that instructions and data executed within them are protected against access and manipulation from the rest of the system. The TEE may employ hardware mechanisms to respond to remote attestation challenges which can be used to validate the system's integrity to an external party, such as the other nodes in the congress.

Each member node may use a certified TEE configured to generate one or more random secret values which remains inaccessible to the host system without compromising the hardware at the integrated circuit level. Secret values generated in this way would be used in distributed generation of private key shares (e.g., at operation 410 of the method 400 of FIG. 4). This secret value could also be used to establish the shared public key in the set-up phase of the congress. Computations associated with the set-up protocol are performed within the TEE enclaves so that no member or former member can derive any information about their own or others private key shares from inter-member communication or any other method. The enclaves within the TEEs enable a remote attestation protocol to be performed which may be used to prove to other nodes that the TEE enclave is authentic and that it is running approved computer-readable instructions.

Computations associated with group changes are performed within the TEE enclave. For example, the generation of a new secure random secret that may be used in calculating a new polynomial for the purposes of SSS is performed in the TEE enclave.

The TEE enclave also aims to ensure that previous key shares and previous secrets that are no longer to be used are securely deleted before a member deposit can be returned. More particularly, in order to have a member deposit returned, an attestation protocol may require that the TEE enclave publicly attests to the deletion of a key share. Each node 102 may interpret such an attestation as a confirmation that the required deletion has occurred on other nodes through the remote attestation protocol. Thus, the method 800 may also include confirming that a private key share previously held within the TEE of a member who has left the congress has been deleted from a node associated with that member. This confirmation may be performed by receiving attestation of deletion of the private key share. Accordingly, the remote attestation protocol may be used to obtain attestation to the deletion of the private key share previously held in the TEE of a member who has left the congress.

The method 600 of FIG. 6 and the method 700 of FIG. 7 each offer various benefits. For example, the method 600 of FIG. 6 does not rely on secure deletion and does not need to rely on trusted hardware. However, the method 600 of FIG. 6 could benefit from such hardware since, in some circumstances, such hardware may make the malicious pooling of key shares more unlikely.

The method 700 of FIG. 7 avoids having to relock digital assets under a new congress public key each time the membership changes. Further, in some circumstances the method 700 may update membership faster than the method 600 of FIG. 6 since, under the method 700 of FIG. 7 a transaction does not need to be added to the blockchain to move all digital assets to a new public key because digital assets are not moved to a new public key. That is, the membership may be updated using the method 700 of FIG. 7 without having to wait for several blocks to be generated to confirm transfer of the digital assets to the new public key since the public key does not change.

Disenrollment from Congress

Figure 8:
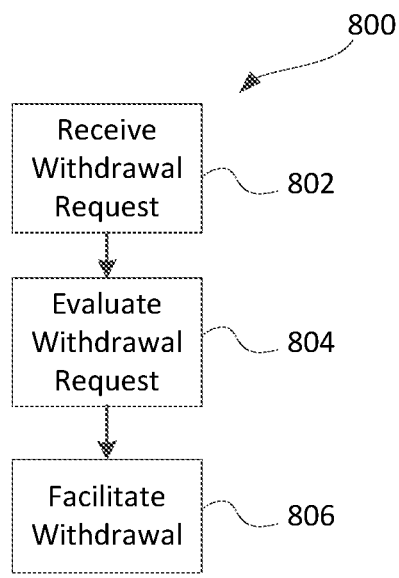
FIG. 8 is a flowchart of an example method of returning a deposit.

As noted above, group members may occasionally request to leave the congress and, when a group member disenrolls from a congress, the digital assets that they deposited to the congress pool may be returned to them. Referring now to FIG. 8, an example method 800 of returning a deposit is illustrated in flowchart form. The method may be performed by a node 102 in cooperation with other nodes 102 of the congress.

At operation 802 of the method 800, the node 102 receives a withdrawal request from a requestor who is a congress member. The withdrawal request may also be referred to as a disenrollment request. The withdrawal request is a request to withdraw digital assets previously deposited by the requestor and currently controlled by the congress. The request may have been broadcast, by the requestor to all congress members.

In response to receiving the request, the node 102, at operation 804, evaluates the request against determined criteria. Such criteria may be predetermined criteria. If the congress operates according to a congress protocol in which the congress public key is not changed each time group membership changes, then at operation 804, the node 102 may confirm that a private key share has been deleted by the requestor. Such confirmation may be obtained using a remote attestation protocol associated with a TEE.

If the congress protocol is one in which the congress public key is changed when membership changes, the node 102 may not confirm deletion of the private key share since the private key share is no longer effective. Instead, a new congress public key may be used and other digital assets under congress control may be transferred to the new congress public key.

At operation 804, the evaluation may also consider whether a ghost chain is currently deployed. If a ghost chain is deployed, the withdrawal request may not be fulfilled until the end of a ghost chain run. That is, the congress members who are mining on the ghost chain are prevented from withdrawing their "stake" of digital assets at least until the ghost chain terminates.

If the node 102 approves the withdrawal request based on the evaluation, at operation 806 the node facilitates withdrawal of the digital assets. That is, the node 102 uses its private key share to cooperatively generate a digital signature and uses the digital signature to transfer the digital assets previously deposited by the requestor back to the requestor. For example, the digital assets may be sent back to the address from which they were previously received. Operation 806 is performed in accordance with the threshold signature scheme so that the withdrawal is only effected if at least the threshold number of congress members authorize the withdrawal. Operation 806 is performed after the member who desires to disenroll is suspended from activity for a period of time. This waiting period prevents the member from engaging in misbehaviour while the protocol for return of their member deposit is being performed.

The congress protocol may be used for a number of different purposes. The congress provides a secure mechanism for performing various functions. The congress may operate trustlessly and provides control of ownership over a digital asset.

The congress protocol may, for example, be used to implement a ghost chain, in which case, the congress protocol may be referred to as a ghost chain protocol.

Congress as Hub Failsafe

Figure 9:
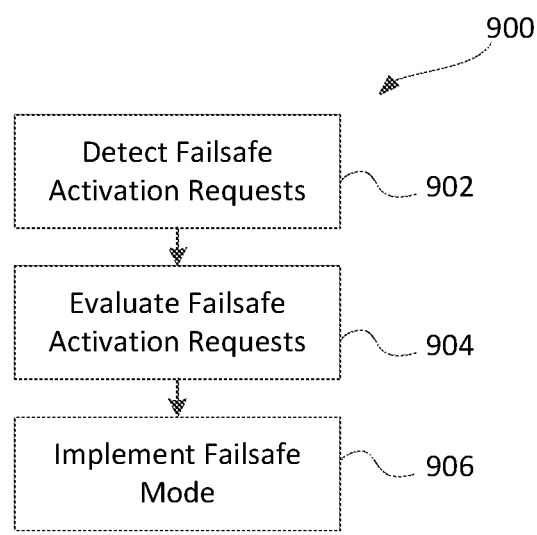
FIG. 9 is a flowchart of an example method of implementing a failsafe mode for a payment channel.

Referring now to FIG. 9, an example method 900 of implementing a failsafe mode is illustrated in flowchart form. The method 900 may be performed by a node 102 that is a member of a congress 110 in cooperation with other nodes 102 that are members of the congress 110. That is, the method 900 is performed by a node 102 that has already joined the congress 110 through deposit of a member deposit into a congress pool, as described above. The node 102 performing the method 900 has, therefore, obtained a private key share, as described above prior to performance of the method 900 of FIG. 9.

At operation 902, the node 102 detects one or more failsafe activation requests issued by one or more nodes participating in a payment channel with a hub. The payment channels allow for commitments for an exchange of value associated with a blockchain network to be exchanged external to the blockchain network. For example, as explained above, value may be exchanged using commitment transactions and values (for potential breach remedy transactions) which may be committed to the blockchain at any time.

The failsafe activation requests are requests issued by nodes that previously opened payment channels by broadcasting a funding transaction as described above with reference to FIG. 3 and, in particular, operation 304 of the method 300 of FIG. 3. The funding transaction encumbers a digital asset with a congress public key (i.e., with a public key that is associated with the group of nodes forming the congress). More particularly, as described above with reference to FIG. 3, each funding transaction encumbers the digital asset with three separate public keys so that the encumbrance may be removed by both nodes associated with a payment channel operating together or by the congress acting alone.

The failsafe activation request may be of the type described above with reference to operation 310 of the method 300 of FIG. 3. As noted in the discussion of FIG. 3 above, the failsafe activation requests may be submitted to a web server which acts as a central repository for failsafe activation requests. Accordingly, the node performing the method 900 of FIG. 9 may monitor the web server for failsafe activation requests.

Each failsafe activation request may be generated within the enclave at the request of the node connected to the malfunctioning hub and signed using an enclave private key associated with the enclave public key. The failsafe activation request may specify the state of a payment channel. The state of the payment channel is the balance of the payment channel, and the state or balance defines the allocation of digital assets when a most recent state of the payment channel (as reflected by the most recent commitment transactions) is taken into account. The failsafe activation request may also include other information. For example, the failsafe activation request may specify a fee that is offered by the node for closing the payment channel. The failsafe activation request may also include freshness data, such as a timestamp. The timestamp or other freshness data may specify the date and/or time when the failsafe activation request was generated or issued. Alternatively, the timestamp may specify a block number of a most recent block added to the blockchain of the blockchain network.

At operation 904, the node performing the method 900 evaluates the failsafe activation request(s). For example, the node may evaluate the freshness of each failsafe activation request. The nodes of the congress may be configured to ignore failsafe activation requests that are expired (i.e., that are not considered to be sufficiently current) and each failsafe activation request may include freshness information, such as a timestamp, that allows the node to determine whether a respective failsafe activation request has expired. For example, the freshness information may be a most recent block number observed by the node that submitted the failsafe activation request and the group may disregard a failsafe activation request that is determined to be expired based on the block number specified in the failsafe activation request and based on a current block number of the most recent block added to the blockchain. That is, each failsafe activation request may specify a respective block number of a most recent block added to the blockchain of the blockchain network when that failsafe activation request was generated and the group (i.e., the nodes of the congress) is configured to disregard a failsafe activation request that is determined to be expired based on the block number specified in the failsafe activation request and based on a current block number of the most recent block added to the blockchain. The node performing the method 900 may, therefore, assess the freshness of the failsafe activation request based on the number of blocks that have elapsed since the failsafe activation request was issued. This number may be compared to a predetermined threshold or other criterion to determine whether a given failsafe activation request has expired. For example, the criterion may be that the failsafe activation request be issued a number of blocks ago which is small compared to a "wait period" during which a TEE will not transact in the payment channel after the failsafe activation request is issued.

Each failsafe activation request may be mapped to a specific payment channel by the node performing the method and, more particularly, to the funding transactions used to open the payment channel. The node may identify the funding transactions that are associated with a given failsafe activation request since the funding transaction included an enclave public key which corresponds to an enclave private key used to sign the failsafe activation request.

At operation 904, the node performing the method 900 may determine that the failsafe activation request(s) satisfy predetermined criteria and may, in response, implement the failsafe mode at operation 906.

The predetermined criteria may require that a sufficient number of failsafe activation requests (that is, a sufficient number of non-expired failsafe activation requests) be received. The sufficiency of the failsafe activation requests may be determined with reference to a threshold. For example, the predetermined criteria may require that a sufficient number of failsafe activation requests submitted to the congress, weighted by balances of respective nodes issuing such requests, exceeds a defined threshold.

At operation 906, the node performing the method 900, in cooperation with other nodes of the congress, implements the failsafe mode. In doing so, the node, in cooperation with other nodes of the congress, closes out a payment channel associated with the failsafe activation request. To close out the payment channel, a mainchain transaction is prepared and proposed, and partial signatures are added to the proposed transaction by a plurality of nodes of the congress sufficient to generate a valid signature on behalf of the congress. The transaction is then broadcast to the blockchain network. This transaction re-distributes digital assets previously encumbered by the congress public key in a funding transaction that opened the payment channel. More particularly, the digital assets are re-distributed based on the state of the payment channel, as represented in the associated failsafe activation request.

The transaction that closes out a payment channel may close out a plurality of payment channels associated with a plurality of failsafe activation requests. That is, nodes of the congress may perform a batch closing of a plurality of payment channels in a single transaction. Such batch closings reduce the load on the main blockchain network (i.e., on the mainchain). The nodes of the congress may implement other load balancing measures for the blockchain network including, for example, staggering closing transactions. For example, the congress nodes may wait to broadcast at least some transactions that would close payment channels to ensure that the load does not rise beyond a level which could cause disruption to the main blockchain network.

To close a payment channel, a plurality of nodes of a congress cooperatively generates a valid signature for a transaction that closes the payment channel. A temporary sidechain may be deployed by nodes of the congress to facilitate this signing process. This temporary sidechain may be referred to as a ghost chain. In addition to facilitating the signing of a closing transaction, the ghost chain may also allow for a further exchange of value between nodes that were previously party to payment channels connected to a failed hub. That is, before the nodes of the congress cooperatively generate a valid signature for a transaction that would close a payment channel, a temporary sidechain referred to as a ghost chain herein may be deployed. The temporary sidechain may allow value to be further transferred between nodes connected to the hub. Then, when a payment channel is finally closed, the transaction that closes the payment channel is based on the value transferred on the sidechain as well as the initial balance in the payment channel as stated in the failsafe activation request.

An example ghost chain will now be described.

Ghost Chains

Figure 10:
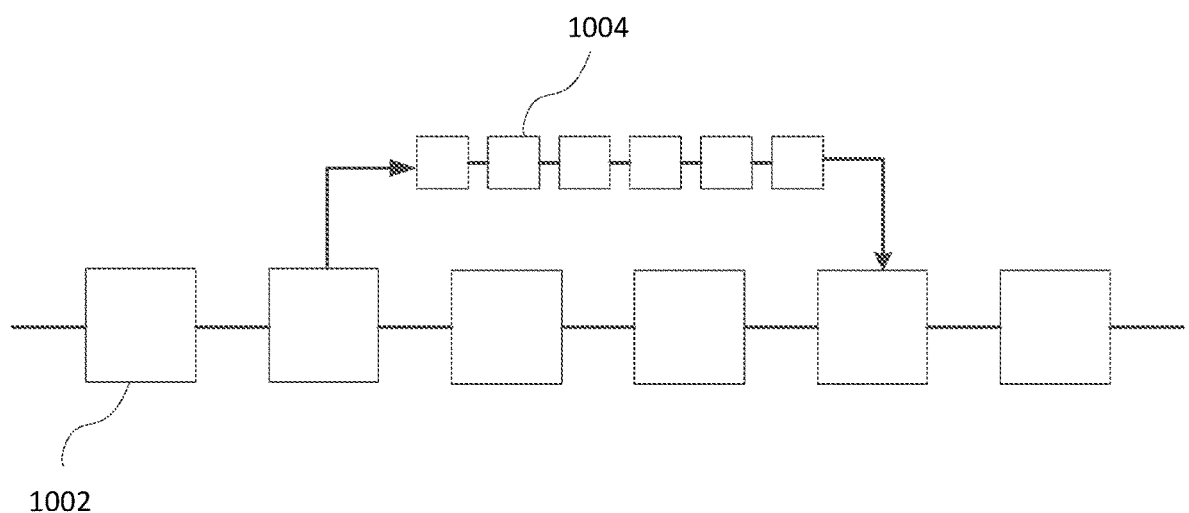
FIG. 10 is a block diagram of a ghost chain.

Referring now to FIG. 10, a blockchain 1002 and a ghost chain 1004 are illustrated. The blockchain 1002 is a block-based distributed proof-of-work ledger. The ghost chain 1004 is a block-based distributed proof-of-stake distributed ledger that may be used to facilitate the closing of a payment channel when a hub associated with the payment channel has failed.

The ghost chain is a proof-of-stake blockchain in which miners of the ghost chain are members of the congress. That is, members of the congress are permitted to mine on the ghost chain. Their member deposit on the proof-of-work blockchain network serves as their stake to allow them to mine on the ghost chain and the probability of any member being selected to mine is proportional to the relative amount of their deposit.

The ghost chain 1004 may be deployed at operation 906 of the method 900 of FIG. 9; that is, when a failsafe mode is implemented. The ghost chain may be instantiated with a genesis block that is the final block (also referred to as a terminal block) from a previous instantiation of the ghost chain. This block may contain information regarding genesis payments. Genesis payments are transfers of digital assets, which are yet to be made that are due based on a previous deployment of the ghost chain.

A number of blocks are added to the ghost chain by miners to generate a valid signature for a transaction whose effect would be to close out a payment channel or to further transfer value between nodes associated with failed payment channels (e.g., these nodes may be connected to the hub that has failed via the "spokes"). More particularly, nodes add partial signatures to the proposed transaction using respective private key shares until a valid signature is produced in accordance with the threshold signature scheme.

To close out a payment channel, a transaction (which may be referred to as a closing transaction) may be constructed and signed (as will be described in greater detail below). This transaction may be a transaction whose effect will be to distribute funds on the main blockchain 1002 based on the state of a payment channel (and, in at least some cases, based on any further transactions of value occurring on the ghost chain). The transaction also distributes funds to remunerate miners of the ghost chain and/or to make genesis payments.

After all payment channels have been closed, the ghost chain 1004 terminates. Since the ghost chain 1004 terminates, it is unlike a typical blockchain in that it has a terminal block. The terminal block may be prepared to contain a record of genesis payments which will be made in the next iteration of the ghost chain. These genesis payments are to incentivize participation. More particularly, nodes that participated in the payment channel closing but who did not receive a transfer of digital assets in return for their participation during this iteration of the ghost chain (e.g., since the closing transaction was prepared prior to their participation)

may be referenced in the terminal block so that they will receive digital assets at the next iteration of the ghost chain.

While the examples described above have referred to operation codes available in Bitcoin, the methods described herein may also be used with other types of blockchain networks.

The methods described above have been generally described as being performed at a node, but features of the method rely on cooperation with other nodes and could be performed elsewhere.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises," and the like, does not exclude the presence of elements or steps other than those listed in any claim or the specification as a whole. In the present specification, "comprises" means "includes or consists of" and "comprising" means "including or consisting of." The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

What is claimed is:

1. A computer-implemented method of updating private key share distributions, comprising:
   detecting a redistribution request;
   identifying congress members using one or more attributes included in at least some of transactions to a public group address associated with the congress members;
   responsive to detecting the redistribution of the request, generating a new private key share, and transferring all digital assets associated with the public group address to a new public address associated with a new public key.

2. The computer-implemented method according to claim 1, wherein the processing resource is a node associated with a blockchain network.

3. The computer-implemented method according to claim 2, wherein the node is associated with a congress.

4. The computer-implemented method according to claim 1, wherein the redistribution request comprises detecting that a prospective new member has transferred digital assets into the public group address.

5. The computer-implemented method according to claim 1, wherein the redistribution request comprises determining that a member of the group associated with the public group address has requested withdrawal of a member deposit.

6. The computer-implemented method according to claim 4, wherein a prospective new member transferring digital assets by nodes requesting to join an associated congress.

7. The computer-implemented method according to claim 1, wherein congress members are identified using presence of absence of attributes that indicate a purpose for a transfer.

8. The computer-implemented method according to claim 7, wherein a flag is included in a transaction when the transferor is not requesting to join the congress.

9. The computer-implemented method according to claim 1, wherein the generation of the private key share is performed within a trusted execution environment.

10. A non-transitory computer-readable storage medium comprising computer-executable instructions that, when executed, configure a processor to perform the method of claim 1.

11. An electronic device comprising:
    an interface device;
    a processor coupled to the interface device;
    a memory coupled to the processor, the memory having stored thereon computer executable instructions that, when executed, configure the processor to perform the method of claim 1.

12. The electronic device according to claim 11, wherein the processor includes a trusted execution environment and wherein the computer executable instructions are executed within the trusted execution environment.

* * * * *